US010965739B2

(12) United States Patent
Xiang et al.

(10) Patent No.: US 10,965,739 B2
(45) Date of Patent: Mar. 30, 2021

(54) TIME-BASED CONGESTION DISCOUNTING FOR I/O FAIRNESS CONTROL

(71) Applicant: VMware, Inc., Palo Alto, CA (US)

(72) Inventors: Enning Xiang, San Jose, CA (US);
Eric Knauft, San Francisco, CA (US);
Yiqi Xu, Redwood City, CA (US);
Xiaochuan Shen, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 277 days.

(21) Appl. No.: 15/947,313

(22) Filed: Apr. 6, 2018

(65) Prior Publication Data

US 2019/0312925 A1 Oct. 10, 2019

(51) Int. Cl.
*H04L 29/08* (2006.01)
*H04L 12/26* (2006.01)
*G06F 3/06* (2006.01)
*G06F 9/455* (2018.01)
*H04L 29/06* (2006.01)

(52) U.S. Cl.
CPC .......... *H04L 67/101* (2013.01); *G06F 3/0604* (2013.01); *G06F 3/067* (2013.01); *G06F 3/0664* (2013.01); *G06F 9/45558* (2013.01); *H04L 43/0882* (2013.01); *H04L 67/1008* (2013.01); *H04L 67/1097* (2013.01); *H04L 67/322* (2013.01); *H04L 69/22* (2013.01)

(58) Field of Classification Search
CPC ... H04L 69/22; H04L 67/322; H04L 67/1097; H04L 67/1008; H04L 43/0882; H04L 67/101; G06F 9/45558; G06F 3/067; G06F 3/0664; G06F 3/0604

USPC ........................................................ 709/213
See application file for complete search history.

(56) References Cited

U.S. PATENT DOCUMENTS 6,240,446 B1 * 5/2001 Casper ................ G06F 11/1004
                                                    709/213
6,289,383 B1 * 9/2001 Rhine .................... G06F 9/5027
                                                    707/999.009

(Continued)

OTHER PUBLICATIONS

Haghdoost, et al. (2017). On the accuracy and scalability of intensive I/O workload replay. In 15th USENIX Conference on File and Storage Technologies (FAST 17) (pp. 315-328). Retrieved from https://www.usenix.org/conference/fast17/technical-sessions/presentation/haghdoost (Year: 2017).*

*Primary Examiner* — Lance Leonard Barry
*Assistant Examiner* — Timothy Sowa
(74) *Attorney, Agent, or Firm* — Loza & Loza, LLP

(57) ABSTRACT

Computer system and method for managing storage requests in a distributed storage system uses congestion signals associated with storage requests, which are generated based on congestion at local storage of the computer system that supports a virtual storage area network. The storage requests are differentiated between a first class of storage requests and at least one other class of storage requests. For a storage request of the first class of storage requests, an actual ratio of a current average bandwidth of the first class of storage requests to a current average bandwidth of a second class of storage requests is calculated and compared with an expected ratio. The congestion signal associated with the storage request is then adjusted and transmitted to at least one source of storage requests for storage request fairness control.

19 Claims, 7 Drawing Sheets

(56) References Cited

U.S. PATENT DOCUMENTS

| | | | | |
|---|---|---|---|---|
| 7,739,470 | B1* | 6/2010 | Norgren | G06F 11/3485 709/224 |
| 2003/0154282 | A1* | 8/2003 | Horvitz | H04L 29/06 709/226 |
| 2004/0003087 | A1* | 1/2004 | Chambliss | G06F 11/1076 709/226 |
| 2012/0057478 | A1* | 3/2012 | Brannstrom | H04W 28/10 370/252 |
| 2014/0082616 | A1* | 3/2014 | Kurita | G06F 9/455 718/1 |
| 2014/0126585 | A1* | 5/2014 | Baptist | H04L 67/1097 370/474 |
| 2014/0344440 | A1* | 11/2014 | Dutta | H04L 41/0823 709/224 |
| 2015/0095489 | A1* | 4/2015 | Makida | G06F 3/061 709/224 |
| 2015/0281357 | A1* | 10/2015 | Makida | G06F 3/0604 709/226 |
| 2016/0072691 | A1* | 3/2016 | Xu | H04B 7/18578 370/252 |
| 2016/0094328 | A1* | 3/2016 | Wang | G06F 9/45533 718/1 |
| 2016/0156538 | A1* | 6/2016 | Yalagandula | G06F 9/45533 709/224 |
| 2016/0182376 | A1* | 6/2016 | De Schepper | H04L 47/26 370/235 |
| 2016/0359973 | A1* | 12/2016 | Loh | H04L 67/1097 |
| 2017/0070443 | A1* | 3/2017 | Ong | H04L 41/0896 |
| 2018/0131613 | A1* | 5/2018 | Fraser | H04L 47/12 |

* cited by examiner

TIME-BASED CONGESTION DISCOUNTING FOR I/O FAIRNESS CONTROL

BACKGROUND

A distributed storage system allows a cluster of host computers to aggregate local storage devices, which may be located in or attached to each host computer, to create a single and shared pool of storage. This pool of storage is accessible by all host computers in the cluster, including any virtualized instances running on the host computers, such as virtual machines. Because the shared local storage devices that make up the pool of storage may have different performance characteristics, such as capacity, input/output per second (IOPS) capabilities, etc.), usage of such shared local storage devices to store data may be distributed among the virtual machines based on the needs of each given virtual machine.

This approach provides enterprises with cost-effective performance. For instance, distributed storage using pooled local storage devices is inexpensive, highly scalable, and relatively simple to manage. Because such distributed storage can use commodity storage devices, e.g., disk drives, in the cluster, enterprises do not need to invest in additional storage infrastructure. However, one issue that arises with this approach relates to contention between multiple clients, such as virtual machines on different host computers, accessing the shared storage resources. In particular, reduced overall performance and higher latency occur when multiple clients and/or other software processes need to simultaneously access the same local storage devices.

BRIEF DESCRIPTION OF THE DRAWINGS

Throughout the description, similar reference numbers may be used to identify similar elements.

DETAILED DESCRIPTION

Figure 1:
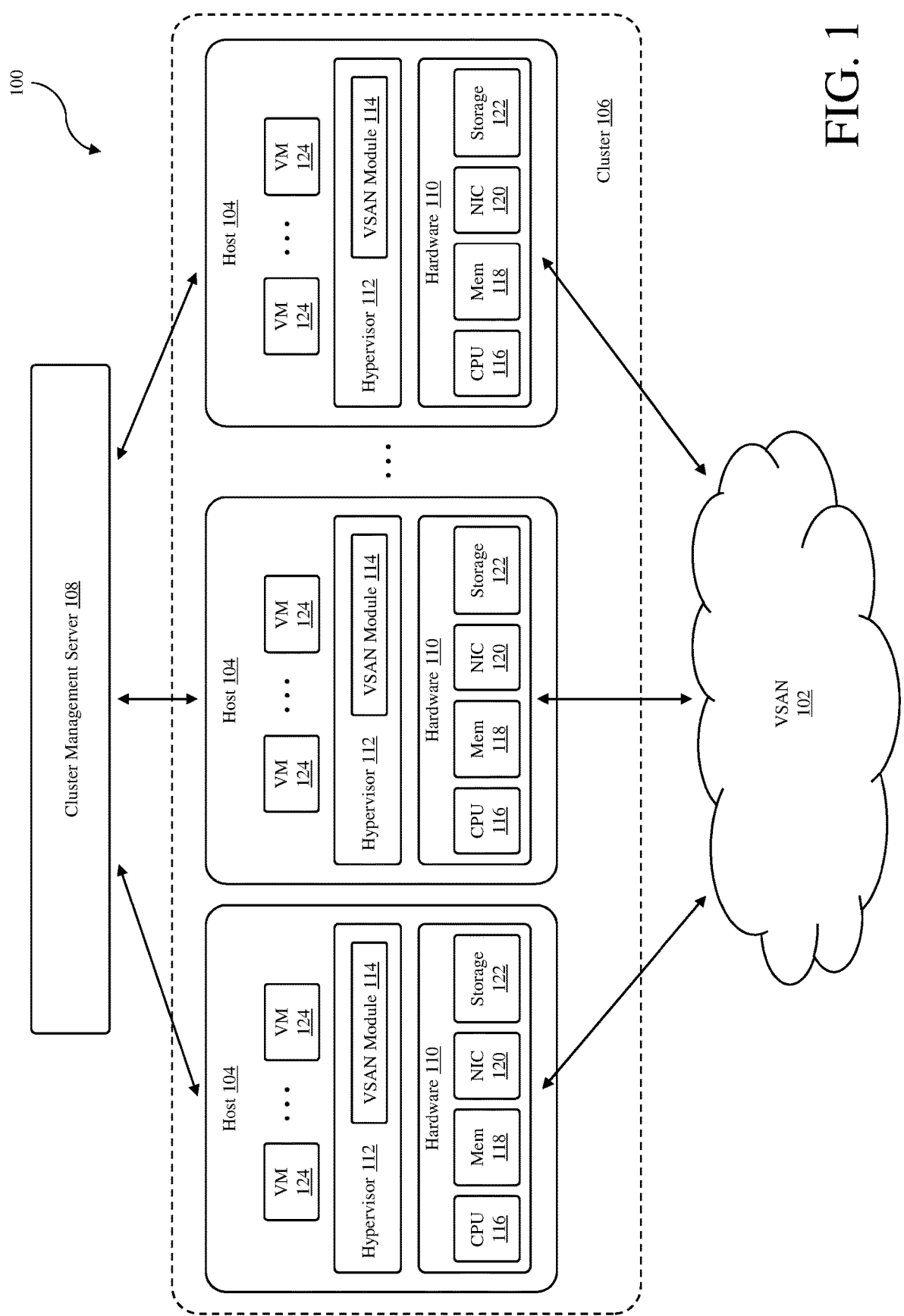
FIG. 1 is a block diagram of a distributed storage system in accordance with an embodiment of the invention.

FIG. 1 illustrates a distributed storage system 100 in accordance with an embodiment of the invention. As shown in FIG. 1, the distributed storage system 100 provides a software-based "virtual storage area network" (VSAN) 102 that leverages local storage resources of host computers 104, which are part of a logically defined cluster 106 of host computers that is managed by a cluster management server 108. The VSAN 102 allows local storage resources of the host computers 104 to be aggregated to form a shared pool of storage resources, which allows the host computers 104, including any software entities running on the host computers, to use the shared storage resources.

The cluster management server 108 operates to manage and monitor the cluster 106 of host computers. The cluster management server may be configured to allow an administrator to create the cluster 106, add host computers to the cluster and delete host computers from the cluster. The cluster management server may also be configured to allow an administrator to change settings or parameters of the host computers in the cluster regarding the VSAN 102, which is formed using the local storage resources of the host computers in the cluster. The cluster management server may further be configured to monitor the current configurations of the host computers and any virtual instances running on the host computers, for example, virtual machines (VMs). The monitored configurations may include hardware configuration of each of the host computers and software configurations of each of the host computers. The monitored configurations may also include virtual instance hosting information, i.e., which virtual instances (e.g., VMs) are hosted or running on which host computers. The monitored configurations may also include information regarding the virtual instances running on the different host computers in the cluster.

The cluster management server 108 may also perform operations to manage the virtual instances and the host computers 104 in the cluster 106. As an example, the cluster management server may be configured to perform various resource management operations for the cluster, including virtual instance placement operations for either initial placement of virtual instances and/or load balancing. The process for initial placement of virtual instances, such as VMs, may involve selecting suitable host computers for placement of the virtual instances based on, for example, memory and CPU requirements of the virtual instances, the current memory and CPU loads on all the host computers in the cluster and the memory and CPU capacity of all the host computers in the cluster.

In some embodiments, the cluster management server 108 may be a physical computer. In other embodiments, the cluster management server may be implemented as one or more software programs running on one or more physical computers, such as the host computers 104 in the cluster 106, or running on one or more virtual machines, which may be hosted on any host computers. In an implementation, the cluster management server is a VMware vCenter® server with at least some of the features available for such a server.

As illustrated in FIG. 1, each host computer 104 in the cluster 106 includes hardware 110, a hypervisor 112, and a VSAN module 114. The hardware 110 of each host computer includes hardware components commonly found in a physical computer system, such as one or more processors 116, one or more system memories 118, one or more network interfaces 120 and one or more local storage devices 122 (collectively referred to herein as "local storage"). Each processor 116 can be any type of a processor, such as a central processing unit (CPU) commonly found in a server. In some embodiments, each processor may be a multi-core processor, and thus, includes multiple independent processing units or cores. Each system memory 118, which may be random access memory (RAM), is the volatile memory of the host computer 104. The network interface 120 is an interface that allows the host computer to communicate with a network, such as the Internet. As an example, the network interface may be a network adapter. Each local storage device 122 is a nonvolatile storage, which may be, for example, a solid-state drive (SSD) or a magnetic disk.

The hypervisor 112 of each host computer 104, which is a software interface layer that, using virtualization technology, enables sharing of the hardware resources of the host computer by virtual instances 124, such as VMs, running on the host computer. With the support of the hypervisor, the VMs provide isolated execution spaces for guest software.

The VSAN module 114 of each host computer 104 provides access to the local storage resources of that host computer (e.g., handle storage input/output (I/O) operations to data objects stored in the local storage resources as part of the VSAN 102) by other host computers 104 in the cluster 106 or any software entities, such as VMs 124, running on the host computers in the cluster. As an example, the VSAN module of each host computer allows any VM running on any of the host computers in the cluster to access data stored in the local storage resources of that host computer, which may include virtual disks (or portions thereof) of VMs running on any of the host computers and other related files of those VMs. In addition to these VM I/Os, the VSAN module may handle other types of storage I/Os, such as namespace I/Os, resync I/Os, and internal metadata I/O. Namespace I/Os are writes and read operations for configuration files for VMs, such as vmx files, log files, digest files and memory snapshots. Resync I/Os are writes and read operations for data related to failed disks, host computers, racks or clusters. Internal metadata I/Os writes and read operations that are performed on internal data structures other than actual data, such as operations to read from logs, bitmaps, or policies. The VSAN module is designed to provide fairness among these different classes of storage I/O requests, which may have different I/O patterns due to their different workloads. As an example, the resync I/O traffic is one type of internal I/O traffic that needs to get it's fair share compared to VM I/Os, but not too much as to significantly affect the throughput of the VM I/Os, which may be detectable by the VM users.

In some VSAN systems, there are two typical I/O workloads. The first is the external guest VM I/O workload, which can have very high OIO (outstanding IO). The second is system internal inter-component data resynchronization IO workload, which is sequential from the perspective of the resynchronization job and always only has one OM from the perspective of one VSAN object. For each I/O workload, there are different kinds of resource constraint in different layers in a VSAN system. For the lowest data persistent layer, generally speaking, there are two kinds of resource constraints, one is the shared resource constraint (e.g., the constraint is shared among all components within one disk group or a host computer), and the other is non-shared constraint exclusively and individually operated on a data unit (e.g., VSAN object or VSAN data component), which has no impact on other data components in the same disk group or host computer.

In order to avoid system overwhelming problem, a conventional VSAN system may have a congestion-based flow control mechanism to propagate resource constraint notification from the lowest data persistent layer to upper data path layers, which is used especially when the data persistent layer is close to or reaches its maximum resource constraint. However, the congestion-based flow control mechanism will ultimately translate the resource constraint into a delay time, and the incoming I/O requests will be delayed at the VSAN I/O distributed coordinator (distributed object manager (DOM) Owner) or at VSAN I/O interface layer (DOM client). Thus, if the resource constraint is not handled properly, the throughput of each I/O workload will be totally determined by its OIO, which will cause I/O unfairness between guest VM I/Os and VSAN resynchronization I/Os, as well as other type of storage I/Os. The VSAN module 114 of each host computer 104 in the distributed storage system 100 addresses the I/O fairness issue when the congestion or delay is caused by the per-component resource constraint.

The VSAN module 114 is designed to fairly process non-shared resource fullness, also known as component congestions, as opposed to diskgroup congestion. This is a challenging problem because when only a small number of components receive large amounts of storage I/O requests, a component could be under heavy VM I/O workload along with a resync I/O workload. In this scenario, component congestion will be more significant than diskgroup congestion, dominating per I/O latency delay. As described in detail below, the VSAN module 114 uses the ratio of resync/non-resync I/O bandwidth to drive a subsequent throttling action, which adjusts resync I/O discount since resync I/O's are susceptible to using low (e.g., down to 1) OIOs during the straggler phase. The resync discounting process is a feedback control loop to minimize resync I/O's unfairness, which is more likely to happen than VM I/O unfairness because VM I/O workload can always use more OIO more easily, but resync OIO is controlled to be fixed (e.g., 1) for each component. Thus, VM I/O throughput is determined by the latency of each resync I/O, which includes the delay converted from component congestion.

Figure 2:
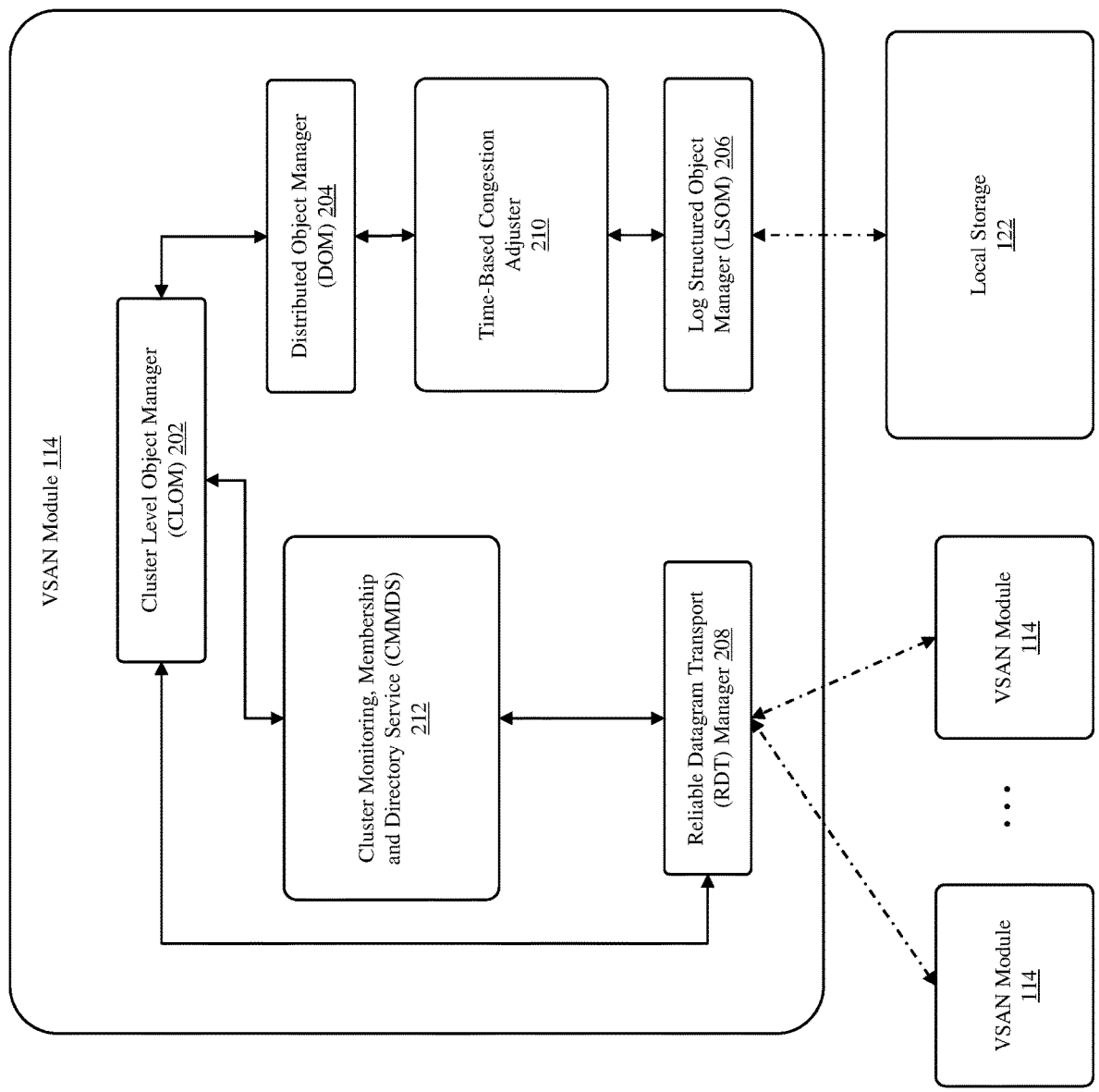
FIG. 2 is a block diagram of a virtual storage array network (VSAN) module in each host computer of the distributed storage system in accordance with an embodiment of the invention.

Turning now to FIG. 2, components of the VSAN module 114, which is included in each host computer 104 in the cluster 106, in accordance with an embodiment of the invention are shown. As shown in FIG. 2, the VSAN module includes a cluster level object manager (CLOM) 202, a distributed object manager (DOM) 204, a local log structured object management (LSOM) 206, a reliable datagram transport (RDT) manager 208, a time-based congestion adjuster 210 and a cluster monitoring, membership and directory service (CMMDS) 212. These components of the VSAN module may be implemented as software running on each of the host computers in the cluster.

The CLOM 202 operates to validate storage resource availability, and DOM 204 operates to create components and apply configuration locally through the LSOM 206. The DOM also operates to coordinate with counterparts for component creation on other host computers 104 in the cluster 106. All subsequent reads and writes to storage objects funnel through the DOM 204, which will take them to the appropriate components. The LSOM operates to monitor the flow of storage I/O operations to the local storage 122, for example, to report whether a storage resource is congested. In an embodiment, the LSOM generates a congestion signal that indicates current storage usage, such as the current tier-1 device resource fullness, which indicates the current congestion at the local storage 122. The RDT manager 208 is the communication mechanism for storage I/Os in a VSAN network, and thus, can communicate with the VSAN modules in other host computers in the cluster. The RDT manager uses transmission control protocol (TCP) at the transport layer and it is responsible for creating and destroying TCP connections (sockets) on demand. The time-based congestion adjuster 210 operates to selectively adjust or modify congestion signals from the LSOM 206 using time-based rolling average bandwidths of different classes of storage I/O requests, which is computed by the DOM 204, to ensure fairness between the different classes of storage I/O requests, e.g., between resync storage I/O requests and non-resync storage I/O requests, with respect to management of the storage I/O requests, as described in detail below. The CMMDS 212 is responsible for monitoring the VSAN cluster's membership, checking heartbeats between the host computers in the cluster, and publishing updates to the cluster directory. Other software components use the cluster directory to learn of changes in cluster topology and object configuration. For example, the DOM uses the contents of the cluster directory to determine the host computers in the cluster storing the components of a storage object and the paths by which those host computers are reachable.

Figure 3A:
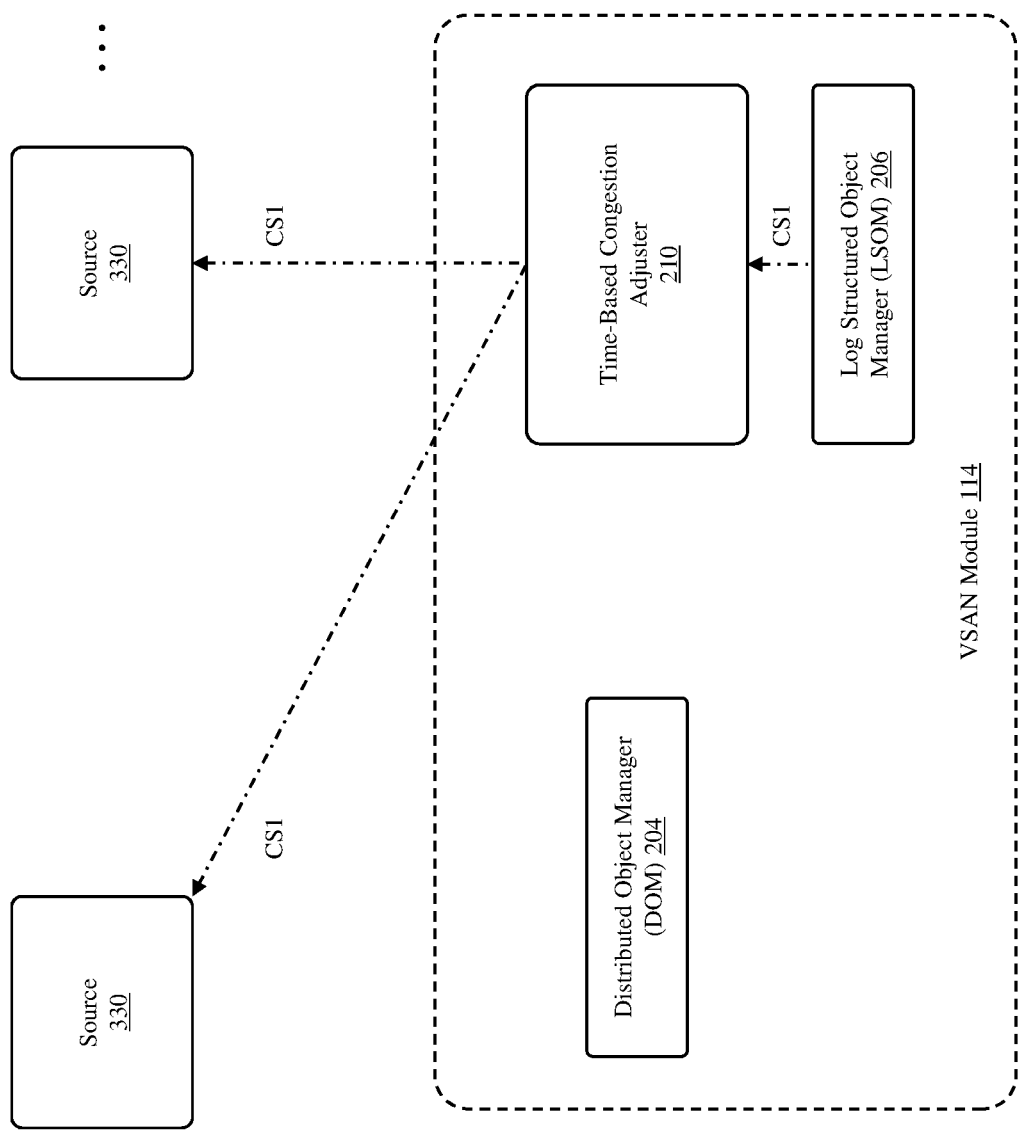
FIG. 3A illustrates a congestion signal for a non-resync I/O request being generated and transmitted to sources of storage I/O requests in accordance with an embodiment of the invention.
Figure 3B:
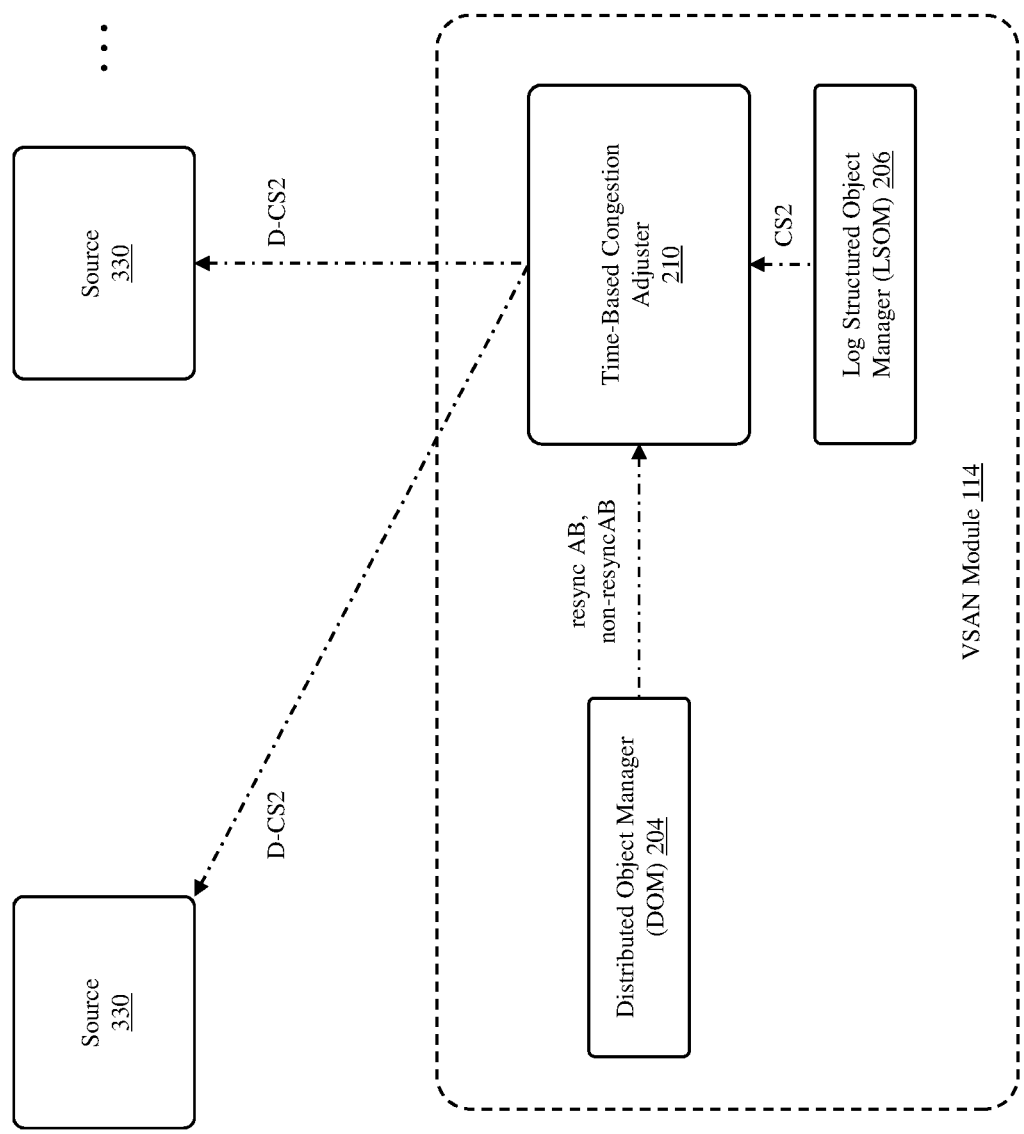
FIG. 3B illustrates a congestion signal for a resync I/O request being generated, adjusted and transmitted to the sources of storage I/O requests in accordance with an embodiment of the invention.

In an embodiment, as illustrated in FIGS. 3A and 3B, the components of the VSAN module 114 of a host computer operate to generate and transmit congestion signals to sources 330 of storage I/O requests. In FIGS. 3A and 3B, some of the components of the VSAN 114 are not illustrated. The sources 330 of storage I/O requests may include the host computers 104 of the cluster 106, the VMs 124 running on the host computers 104 and software processes or routines (not shown) operating in the host computers 104. Each congestion signal transmitted from the VSAN module 114 of the host computer 104 to the sources 330 provides information on the current fullness of the local storage 122 of that host computer for one or more classes of storage I/O requests. Each host computer that receives a congestion signal from the VSAN module 114 may implement a delay based on the received congestion signal, which may be a time-averaged latency-based delay. Since each congestion signal is associated with one or more classes of storage I/O requests, the congestion signals from the VSAN module 114 may be used to selectively control the issuance of different classes of storage I/O requests. Thus, if one class of storage I/O requests is indicated as being heavily congested by the received congestion signals, the host computers in the cluster may use that information to apply more backpressure on that class of storage I/O requests. However, less backpressure may be applied to other less backlogged classes of storage I/O requests so that the different classes of storage I/O requests may be processed in a fair manner.

The congestions signals for different classes of storage I/O requests are processed differently by the components of the VSAN 114. In one embodiment, resync storage I/O requests and non-resync storage I/O requests are handled differently with respect to the congestion signals. In this embodiment, congestion signals generated by the LSOM 206 for resync storage I/O requests may be adjusted by the time-based congestion adjuster 210. However, congestion signals generated by the LSOM 206 for non- resync storage I/O requests, e.g., VM I/O requests, namespace I/O requests and internal metadata I/O requests, are not adjusted by the time-based congestion adjuster 210. Each congestion signal for resync storage I/O requests may be adjusted or discounted depending on the current time-based rolling average bandwidth for resync storage I/O requests and the current time-based rolling average bandwidth for storage I/O requests of another class, such as VM storage I/O requests, which are calculated by the DOM 204, as described in detail below. Thus, congestion signals for resync storage I/O requests may be discounted so that more resync storage I/O requests are processed than other non-resync storage I/O requests, such as VM storage requests, when storage constraint conditions warrant such action.

As illustrated in FIG. 3A, for a non-resync storage I/O request, such as a VM storage I/O request, the LSOM 206 generates a congestion signal CS1 when conditions in the local storage 122 warrants that such congestion signal be issued. As an example, a congestion signal may be generated by the LSOM 206 when write requests in a write buffer (not shown) exceeds certain threshold. The value of a congestion signal may vary depending on how much that threshold is exceeded by the write requests in the write buffer. For example, the value of a congestion signal may be from zero (0) to two hundred fifty-five (255), where 0 indicates the minimal congestion for the local storage and 255 indicates the maximum congestion for the local storage. The congestion signal CS1 is transmitted from the LSOM 206 to the time-based congestion adjuster 210 with a returned storage I/O request. Because the congestion signal CS1 is associated with a non-resync storage I/O request, the congestion signal CS1 is transmitted to the sources 330 without being adjusted by the time-based congestion adjuster 210 so that delay may be applied to non-resync storage I/O requests.

However, as illustrated in FIG. 3B, for a resync storage I/O request, the LSOM 206 generates a congestion signal CS2 when conditions in the local storage 122 warrants that such congestion signal be issued. The congestion signal CS2 is transmitted from the LSOM 206 to the time-based congestion adjuster 210 with a returned storage I/O request. Because the congestion signal CS2 is associated with a resync storage I/O request, the congestion signal CS2 may be first adjusted or discounted before being transmitted to the sources 330. The amount or percentage that the congestion signal C2 is discounted depends on the current time-based rolling average bandwidth for resync storage I/O requests (resyncAB) and the current time-based rolling average bandwidth for storage I/O requests of another class (non-resyncAB), which are computed and provided to the time-based congestion adjuster 210, and the desired ratio between these two average bandwidths, as described in more detail below. If discount is applied to the congestion signal CS2 by the time-based congestion adjuster 210, the resulting discounted congestion signal D-CS2 is then transmitted to the sources 330 so that less delay may be applied to resync storage I/O requests so that different classes of storage I/O requests may be processed in a more fair manner.

Figure 4:
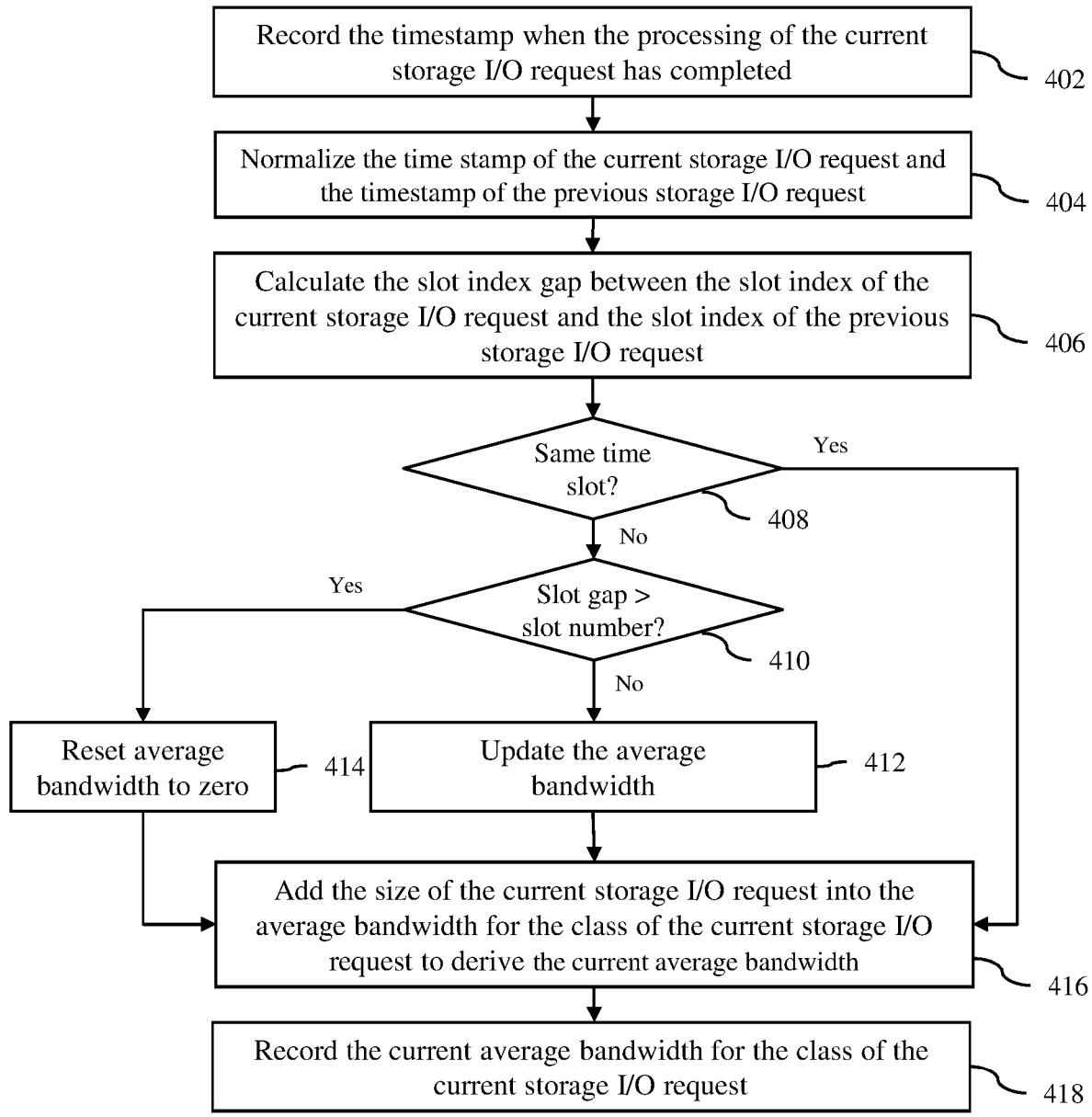
FIG. 4 is a process flow diagram of a storage request management operation executed in each host computer of the cluster in the distributed data storage system in accordance with an embodiment of the invention.

The operation executed by the DOM 204 of the VSAN module 114 in each host computer 104 of the distributed storage system 100 to compute time-based rolling average bandwidths in accordance with an embodiment of the invention is now described with reference to a process flow diagram of FIG. 4. This operation is performed after the processing of each storage I/O request by the DOM 204 has been completed, i.e., the storage I/O request has been processed by the DOM and passed to the LSOM 206. In this operation, rolling average bandwidths are computed based on the elapsed time between consecutive storage I/O requests. As the elapsed time between consecutive storage I/O requests increases, the rolling average bandwidth is reduced further. If too much time has elapsed between storage I/O requests, then the rolling average bandwidth is reset to zero. As described below, the elapse of time between storage I/O requests is measured using a slot gap mechanism, which determines the elapse of time using the gap between time slots for the two consecutive storage I/O requests.

At block 402, the timestamp at the moment when the processing of a current storage I/O request by the DOM has completed is recorded. The timestamp may be a numerical value that corresponds to the time when the timestamp is recorded. Next, at block 404, the timestamp for the current storage I/O request and the timestamp for the previous storage I/O request of the same class of storage I/O requests are normalized using the duration or size of predefined fixed-sized time slots, e.g., 200 milliseconds, which may be configurable. In an embodiment, each timestamp is normalized by dividing the timestamp value by the duration value of the time slots.

Next, at block 406, a slot index gap between the slot index of the current storage I/O request and the slot index of the previous storage I/O request is calculated. In an embodiment, the slot index of the previous storage I/O request is set to zero. The slot index of the current storage I/O request is computed by taking the difference between the normalized timestamp value for the current storage I/O request and the normalized timestamp value for the previous storage I/O request. This difference is then divided by the duration value of the time slots. The resulting value is the time slot index (sometimes referred to herein simply as "slot index") of the current storage I/O request. Thus, if the difference between the normalized timestamp value for the current storage I/O request and the normalized timestamp value for the previous storage I/O request is less than the duration value of the time slots, then the slot indexes of the current and previous storage I/O requests will be the same slot index, i.e., both the current and previous storage I/O requests are in the same time slot. However, if the difference between the normalized timestamp value for the current storage I/O request and the normalized timestamp value for the previous storage I/O request is greater than the duration value of the time slots, then the slot indexes of the current and previous storage I/O requests will be different slot indexes. In such a case, the slot index gap will be larger for greater difference between the normalized timestamp value for the current storage I/O request and the normalized timestamp value for the previous storage I/O request.

Next, at block 408, a determination is made whether the current and previous storage I/O requests are in the same time slot, i.e., the slot index gap between the slot index of the current storage I/O request and the slot index of the previous storage I/O request is zero. If the current and previous storage I/O requests are in the same time slot, then the operation proceeds to block 416. However, if the current and previous storage I/O requests are not in the same time slot, then the operation proceeds to block 410, where a determination is made whether the slot index gap is greater than the total number of time slots, e.g., one hundred twenty-eight (128) time slots. This total number of time slots used by the DOM 204 may have a default setting of 128 time slots, but may be configurable by a user.

If the slot index gap is less than the total number of time slots, then the operation proceeds to block 412, where the time-based rolling average bandwidth for the class of storage I/O requests of the current storage I/O request is updated according to the slot index gap. In an embodiment, the time-based rolling average bandwidth is updated by multiplying the previous time-based rolling average bandwidth for the class of storage I/O requests of the current storage I/O request with the decay weight value for the slot index of the current storage I/O request. The decay weight value may be determined using a predefined decay rate for each unit time slot. As an example, the predefined decay rate may have a default setting of 95% decay for each subsequent time slot, which may be changed by the user. In this example, the decay weight for the first five (5) time slots are 95.0%, 90.3%, 85.7%, 81.5% and 77.4%, respectively. Thus, in this example, the decay weight value for the first five (5) time slots are 0.950, 0.903, 0.857, 0.815 and 0.774, respectively. The operation then proceeds to block 416.

However, if the slot index gap is greater than the total number of time slots, then the operation proceeds to block 414, where the time-based rolling average bandwidth for the class of storage I/O request of the current storage I/O request is set to zero. It is noted here that setting the time-based rolling average bandwidth to zero is similar to multiplying the previous time-based rolling average bandwidth for the class of storage I/O request of the current storage I/O request with the decay weight value for the slot index of the current storage I/O request because the decay weight value for the 128th time slot is 0.001 or 0.1%. The operation then proceeds to block 416.

At block 416, the size of the current storage I/O request is added to the time-based rolling average bandwidth for the class of storage I/O request of the current storage I/O request to derive the current time-based rolling average bandwidth for the I/O class. The size of a storage I/O request can be any size, for example, 1024 bytes. Next, at block 418, the current time-based rolling average bandwidth for the class of storage I/O requests of the current storage I/O request is recorded. The recorded time-based rolling average bandwidths for different classes of storage I/O requests, e.g., resync and VM storage I/O requests, are used by the time-based congestion adjuster 210 of the VSAN module 114 for time-based congestion discount operation, as described in detail below.

Figure 5:
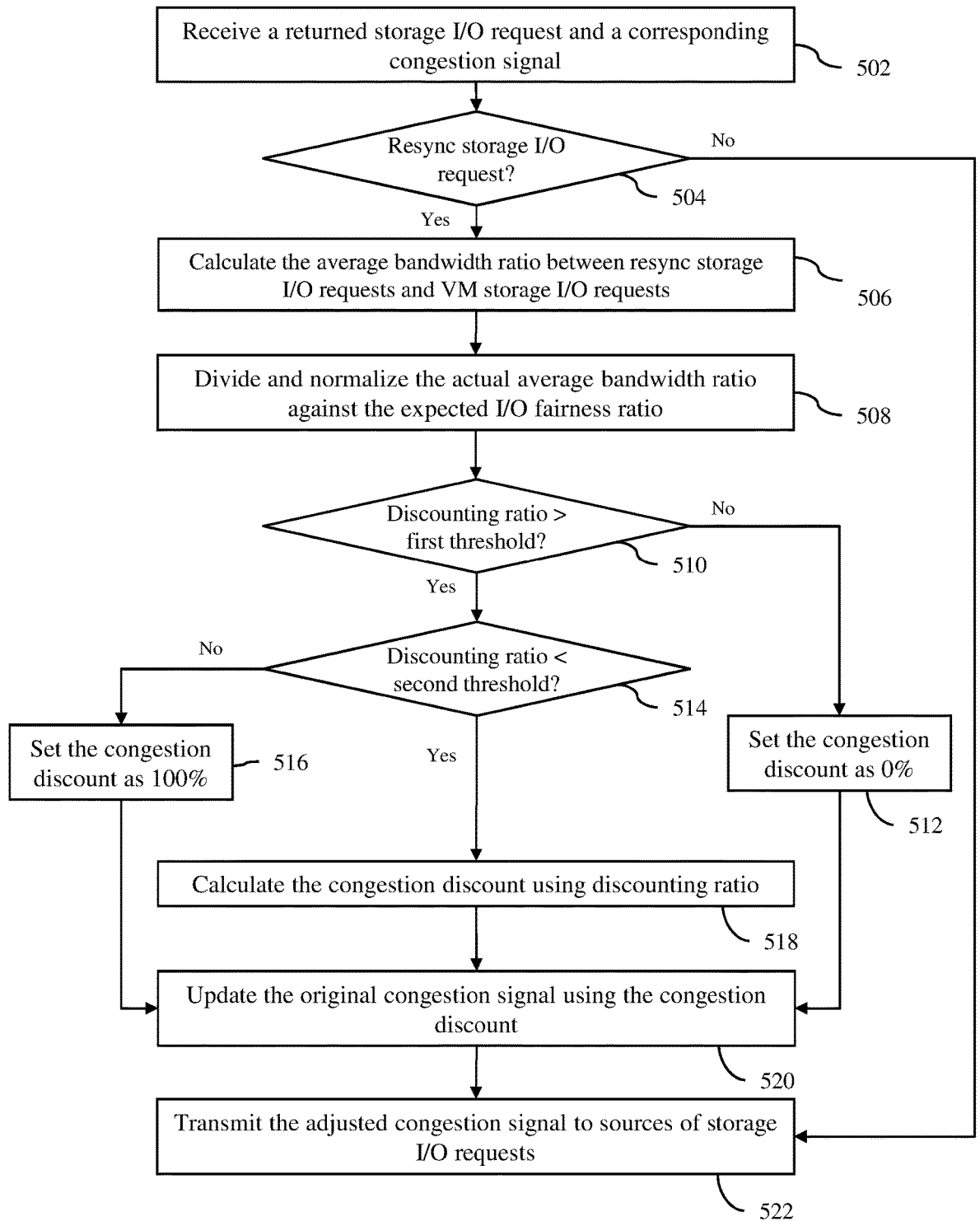
FIG. 5 is a process flow diagram of a storage request management operation executed in each host computer of the cluster in the distributed data storage system in accordance with an embodiment of the invention.

The time-based congestion discount operation executed by the time-based congestion adjuster 210 of the VSAN module 114 in each host computer 104 of the distributed storage system 100 in accordance with an embodiment of the invention is now described with reference to a process flow diagram of FIG. 5. This operation is performed when a storage I/O request, e.g., a write request, is returned from the LSOM 206 of the VSAN module 114 due to congestion at the local storage 122.

At block 502, a returned storage I/O request and a congestion signal from the LSOM 206 are received at the time-based congestion adjuster 210. The congestion signal indicates the amount of congestion at the persistent layer of the host computer, i.e., the local storage devices of the host computer. In an embodiment, the congestion signal includes a value from zero (0) to two hundred fifty-five (255), where 0 indicates no storage resource constraint and 255 indicates the maximum storage resource constraint.

Next, at block 504, a determination is made whether the returned storage I/O request is a resync storage I/O request. In some embodiments, the different classes of storage I/O requests may be differentiated by examining at one or more flags that are set in the headers of the storage I/O requests. These flags may be set by DOM client (that handles regular I/Os) and DOM owner (that handles internally initiated I/Os, such as resync I/Os). The class of a storage I/O request may be identified by looking at an OperationType flag in the header of the storage I/O request, which may indicate that the storage I/O request is, but not limited to, a VM I/O request, a namespace I/O request, an internal metadata I/O request or a resync I/O request. Thus, the OperationType flag of a storage I/O request can indicate whether that storage I/O request belongs to the class of resync storage I/O requests or not. If the returned storage I/O request is not a resync storage I/O request, the operation proceeds to block 522. However, if the returned storage I/O request is a resync storage I/O request, the operation proceeds to block 506, where the ratio of the time-based rolling average bandwidth for resync storage I/O requests to the time-based rolling average bandwidth for VM storage I/O requests is calculated. This average bandwidth ratio will be referred to herein as the actual ratio of the time-based rolling average bandwidth for resync storage I/O requests to the time-based rolling average bandwidth for VM storage I/O requests or the actual average bandwidth ratio. Thus, returned storage I/O requests are differentiated between the one class of storage I/O requests, e.g., resync storage I/O requests, and other classes of storage I/O requests, e.g., VM I/O requests, namespace I/O requests and internal metadata I/O requests.

Next, at block 508, the actual average bandwidth ratio is divided and normalized against an expected I/O fairness ratio of the average bandwidth for resync storage I/O requests to the average bandwidth for VM storage I/O requests to derive a normalized discounting ratio. The expected average bandwidth ratio, which may be simply referred to herein as the expected ratio, be configurable by the user. In this fashion, the actual average bandwidth ratio is compared with the expected average bandwidth ratio. In an embodiment, the default setting for the expected average bandwidth ratio may be a ratio of 4:1 for the average bandwidth for resync storage I/O requests to the average bandwidth for VM storage I/O requests. The normalized discounting ratio may be expressed as a percent or a decimal.

Next, at block 510, a determination is made whether the normalized discounting ratio is greater than a first threshold, which may be a configurable value expressed as a percent or a decimal. As an example, the first threshold may be set to a default setting of 150%. If the normalized discounting ratio is not greater than the first threshold, the operation proceeds to block 512, where the congestion discount is set as 0% or its equivalent. The operation then proceeds to block 520. However, if the normalized discounting ratio is greater than the first threshold, the operation proceeds to block 514, where another determination is made whether the normalized discounting ratio is less than a second threshold, which is higher than the first threshold. Similar to the first threshold, the second threshold may be a configurable value expressed as a percent or a decimal. As an example, the second threshold may be set to a default setting of 500%.

If the normalized discounting ratio is not less than the second threshold, i.e., greater than the second threshold, the operation proceeds to block 516, where the congestion discount is set as 100% or its equivalent. The operation then proceeds to block 520. However, if the normalized discounting ratio is less than the second threshold, i.e., less than the second threshold and greater than the first threshold, the operation proceeds to block 518, where the congestion discount is calculated using the normalized discounting ratio. In an embodiment, the value of the congestion discount, which can be between 0% and 100%, is determined linearly by the position of the normalized discounting ratio on a straight linear line from the first threshold to the second threshold, e.g., a straight line from 150% to 500%. Thus, for example, if the normalized discounting ratio is 325% (midpoint on a line from 150% to 500%), then the congestion discount will be 50% (midpoint on a line from 0% and 100%).

Next, at block 520, the congestion signal for the returned storage I/O request, which is a resync storage I/O request, is updated or adjusted using the congestion discount. In an embodiment, the congestion signal for the returned storage I/O request is adjusted by multiplying the original congestion value received from the LSOM by one (1) minus the congestion discount, which can be expressed as: adjusted congestion value=original congestion value*(1−congestion discount).

Next, block 522, the adjusted congestion signal is transmitted to sources of storage I/O requests so that discounted delay can be applied to new storage I/O requests issued from the sources.

The adjusted or discounted congestion signal will help resync I/O requests delay less, balance off the single OM limit of the resync I/O pattern, increase its I/O bandwidth and reach the expected I/O fairness ratio for the different classes of storage I/O requests. Regardless of I/O throughput of the component and per-component resource constraint status, the approach described herein always rebalances more bandwidth to the low OM resync I/O once its bandwidth is squelched too much by high OM guest VM I/O, caused by the resource constraint congestion, and guarantees IO fairness under the per-component resource constraint conditions.

Figure 6:
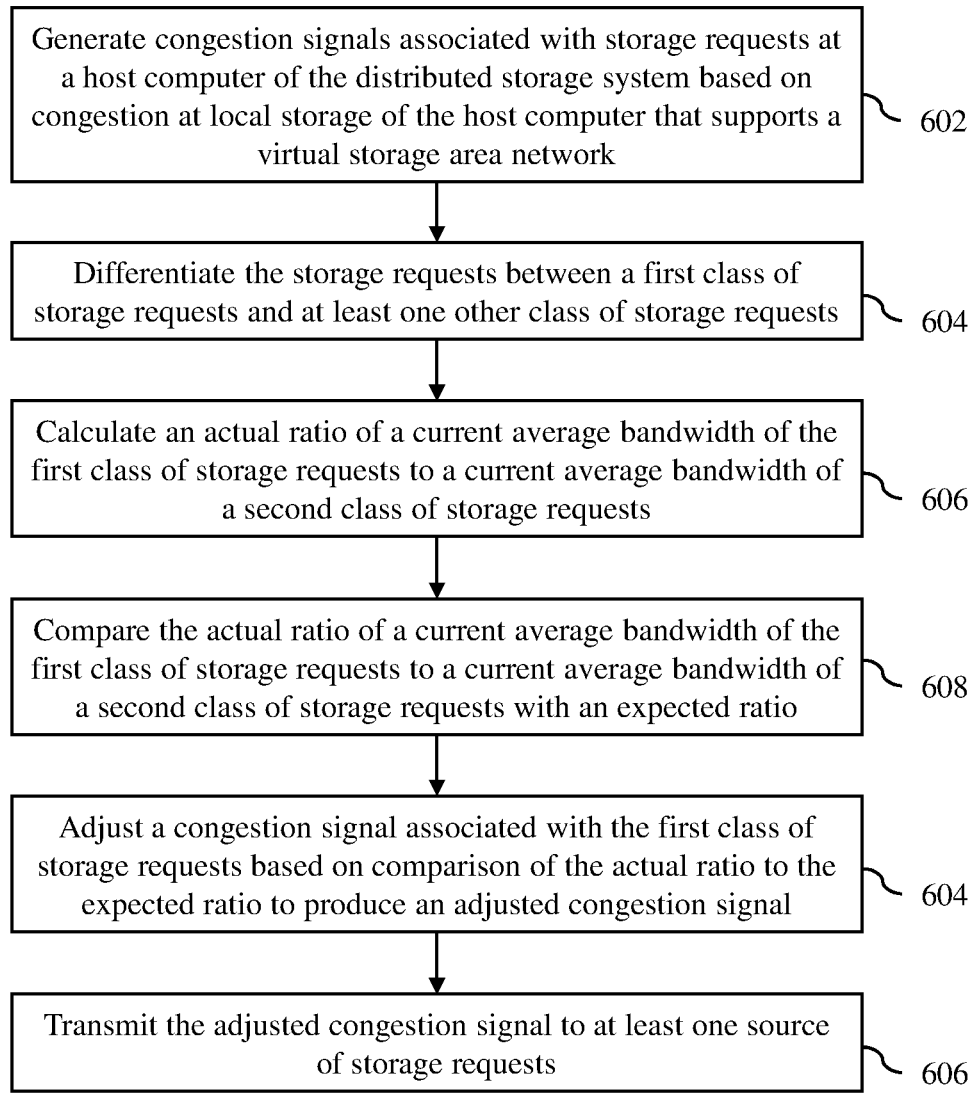
FIG. 6 is a flow diagram of a method of managing storage requests in a distributed storage system in accordance with an embodiment of the invention.

A method for managing storage I/O requests in a distributed storage system in accordance with an embodiment of the invention is described with reference to a flow diagram of FIG. 6. At block 602, congestion signals associated with storage requests at a host computer of the distributed storage system are generate based on congestion at local storage of the host computer that supports a virtual storage area network. At block 604, the storage requests are differentiated between a first class of storage requests and at least one other class of storage requests. At block 606, an actual ratio of a current average bandwidth of the first class of storage requests to a current average bandwidth of a second class of storage requests is calculated. At block 608, the actual ratio of a current average bandwidth of the first class of storage requests to a current average bandwidth of a second class of storage requests is compared with an expected ratio. At block 610, a congestion signal associated with the first class of storage requests is adjusted based on comparison of the actual ratio to the expected ratio to produce an adjusted congestion signal. At block 612, the adjusted congestion signal is transmitted to at least one source of storage requests, the adjusted congestion signal being used for storage request fairness control.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, non-volatile memory, NVMe device, persistent memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray Disc® optical disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for managing storage requests in a distributed storage system, the method comprising:
   generating congestion signals associated with storage requests at a host computer of the distributed storage system based on congestion at local storage of the host computer that supports a virtual storage area network;
   differentiating the storage requests between a first class of storage requests and at least one other class of storage requests;
   calculating an actual ratio of a current average bandwidth of the first class of storage requests to a current average bandwidth of a second class of storage requests;
   comparing the actual ratio of the current average bandwidth of the first class of storage requests to the current average bandwidth of the second class of storage requests with an expected ratio;
   adjusting a congestion signal associated with the first class of storage requests based on comparison of the actual ratio to the expected ratio to produce an adjusted congestion signal; and
   transmitting the adjusted congestion signal to at least one source of storage requests, the adjusted congestion signal being used for storage request fairness control,
   wherein comparing the actual ratio of the current average bandwidth of the first class of storage requests to the current average bandwidth of the second class of storage requests with the expected ratio includes dividing the actual ratio by the expected ratio to derive a discounting ratio.

2. The method of claim 1, further comprising transmitting a second congestion signal, selected from the generated congestion signals, that is associated with another class of storage requests to the at least one source of storage requests without any adjustment.

3. The method of claim 1, further comprising:
   determining whether the discounting ratio is greater than a first threshold; and
   setting a congestion discount to a first value if the discounting ratio is greater than a first threshold.

4. The method of claim 3, further comprising:
   determining whether the discounting ratio is less than a second threshold; and
   setting the congestion discount to a second value if the discounting ratio is less than a second threshold, wherein the second value is greater than the first value.

5. The method of claim 4, further comprising:
   if the discounting ratio is not greater than the first threshold and not less than a second threshold, setting the congestion discount to an intermediate value between the first value and the second value using the discounting value.

6. The method of claim 5, wherein setting the congestion discount to an intermediate value includes determining the intermediate value by the position of the discounting ratio on a linear line from the first threshold to the second threshold.

7. The method of claim 1, further comprising:
   recording a timestamp when a processing of a current storage request has completed;
   determining a slot index of the current storage request, wherein the slot index indicates one of multiple time slots;

calculating a slot index gap between the slot index of the current storage request and a slot index of a previous storage request of the same class of storage requests; and deriving an average bandwidth for the current storage request, the average bandwidth being the current average bandwidth of the first class of storage requests or the current average bandwidth of the second class of storage requests.

8. The method of claim 1, wherein differentiating the storage requests includes examining at least one flag in headers of the storage requests that indicates whether the storage requests belong to the first class of storage requests.

9. A non-transitory computer-readable storage medium containing program instructions for managing storage requests in a distributed storage system, wherein execution of the program instructions by one or more processors of a computer system causes the one or more processors to perform steps comprising:
generating congestion signals associated with storage requests at a host computer of the distributed storage system based on congestion at local storage of the host computer that supports a virtual storage area network;
differentiating the storage requests between a first class of storage requests and at least one other class of storage requests;
calculating an actual ratio of a current average bandwidth of the first class of storage requests to a current average bandwidth of a second class of storage requests;
comparing the actual ratio of a current average bandwidth of the first class of storage requests to a current average bandwidth of a second class of storage requests with an expected ratio;
adjusting a congestion signal associated with the first class of storage requests based on comparison of the actual ratio to the expected ratio to produce an adjusted congestion signal; and
transmitting the adjusted congestion signal to at least one source of storage requests, the adjusted congestion signal being used for storage request fairness control,
wherein comparing the actual ratio of the current average bandwidth of the first class of storage requests to the current average bandwidth of the second class of storage requests with the expected ratio includes dividing the actual ratio by the expected ratio to derive a discounting ratio.

10. The computer-readable storage medium of claim 9, further comprising transmitting a second congestion signal, selected from the generated congestion signals, that is associated with another class of storage requests to the at least one source of storage requests without any adjustment.

11. The computer-readable storage medium of claim 9, further comprising:
determining whether the discounting ratio is greater than a first threshold; and
setting a congestion discount to a first value if the discounting ratio is greater than a first threshold.

12. The computer-readable storage medium of claim 11, further comprising:
determining whether the discounting ratio is less than a second threshold; and
setting the congestion discount to a second value if the discounting ratio is less than a second threshold, wherein the second value is greater than the first value.

13. The computer-readable storage medium of claim 12, further comprising:

if the discounting ratio is not greater than the first threshold and not less than a second threshold, setting the congestion discount to an intermediate value between the first value and the second value using the discounting value.

14. The computer-readable storage medium of claim 13, wherein setting the congestion discount to an intermediate value includes determining the intermediate value by the position of the discounting ratio on a linear line from the first threshold to the second threshold.

15. The computer-readable storage medium of claim 9, further comprising:
recording a timestamp when a processing of a current storage request has completed;
determining a slot index of the current storage request, wherein the slot index indicates one of multiple time slots;
calculating a slot index gap between the slot index of the current storage request and a slot index of a previous storage request of the same class of storage requests; and
deriving an average bandwidth for the current storage request, the average bandwidth being the current average bandwidth of the first class of storage requests or the current average bandwidth of the second class of storage requests.

16. A computer system comprising:
memory; and
a processor configured to:
generate congestion signals associated with storage requests based on congestion at local storage of the computer system that supports a virtual storage area network;
differentiate the storage requests between a first class of storage requests and at least one other class of storage requests;
calculate an actual ratio of a current average bandwidth of the first class of storage requests to a current average bandwidth of a second class of storage requests;
compare the actual ratio of a current average bandwidth of the first class of storage requests to a current average bandwidth of a second class of storage requests with an expected ratio;
adjust a congestion signal associated with the first class of storage requests based on comparison of the actual ratio to the expected ratio to produce an adjusted congestion signal; and
transmit the adjusted congestion signal to at least one source of storage requests, the adjusted congestion signal being used for storage request fairness control,
wherein comparing the actual ratio of the current average bandwidth of the first class of storage requests to the current average bandwidth of the second class of storage requests with the expected ratio includes dividing the actual ratio by the expected ratio to derive a discounting ratio.

17. The computer system of claim 16, wherein the processor is further configured to set a congestion discount to a first value if the discounting ratio is greater than a first threshold, or set the congestion discount to a second value if the discounting ratio is less than a second threshold, wherein the second value is greater than the first value.

18. The computer system of claim 17, wherein the processor is further configured to set the congestion discount to an intermediate value between the first value and the second value using the discounting ratio if the discounting ratio is not greater than the first threshold and not less than a second threshold.

19. The computer system of claim 16, wherein the processor is further configured to:
- record a timestamp when a processing of a current storage request has completed;
- determine a slot index of the current storage request, wherein the slot index indicates one of multiple time slots;
- calculate a slot index gap between the slot index of the current storage request and a slot index of a previous storage request of the same class of storage requests; and
- derive an average bandwidth for the current storage request, the average bandwidth being the current average bandwidth of the first class of storage requests or the current average bandwidth of the second class of storage requests.

* * * * *